United States Patent
Sung

(10) Patent No.: US 6,587,231 B1
(45) Date of Patent: Jul. 1, 2003

(54) SCANNING APPARATUS

(75) Inventor: Hsiung-Wei Sung, Taipei (TW)

(73) Assignee: Teco Image Systems Co., Ltd., Taipei (TW)

(*) Notice: Subject to any disclaimer, the term of this patent is extended or adjusted under 35 U.S.C. 154(b) by 0 days.

(21) Appl. No.: 09/434,304

(22) Filed: Nov. 5, 1999

(51) Int. Cl.[7] .............................................. H04N 1/04
(52) U.S. Cl. ...................... 358/497; 358/497; 358/400; 358/505; 358/494; 358/474; 358/471; 250/208.1; 250/235
(58) Field of Search ............................... 358/497, 400, 358/505, 494, 474, 471; 250/208.1; 382/312

(56) References Cited

U.S. PATENT DOCUMENTS

| | | | |
|---|---|---|---|
| 5,134,081 A | * 7/1992 | Yamazaki et al. | 250/208.1 |
| 5,212,376 A | * 5/1993 | Liang | 358/509 |
| 5,570,204 A | * 10/1996 | Kumashiro | 347/225 |
| 6,172,360 B1 | * 1/2001 | Khovaylo et al. | 382/312 |

* cited by examiner

Primary Examiner—Edward Coles
Assistant Examiner—Heather D Gibbs
(74) Attorney, Agent, or Firm—Rosenberg, Klein & Lee

(57) ABSTRACT

A scanning apparatus comprises a transparent housing, a driving means arranged within the transparent housing, and an image sensor arranged within the transparent housing and driven by the driving means. The upper surface and the lower surface of the transparent housing are marked to define a transparent upper window and a transparent lower window. The image sensor comprises a contact image sensor and a supporting box for housing the contact image sensor. The small article to be scanned is facedown placed on the transparent upper window of the scanning apparatus when the scanning apparatus is in erect arrangement. The large article to be scanned is faced up placed and the user can align the scanning region through the transparent upper window and lower window. Therefore, the inventive scanning apparatus is applicable to scan article of both large and small size, and the transparent upper window and lower window facilitate the alignment of scanner for user for entire scanning or partial scanning of an article.

11 Claims, 7 Drawing Sheets

SCANNING APPARATUS

FIELD OF THE INVENTION

The present invention relates to a scanning apparatus, especially to a scanning apparatus which is in erect arrangement to scan smaller-area image; and is in inverted arrangement to moveably scan whole or partial area of larger-or smaller-area image.

BACKGROUND OF THE INVENTION

In the computer era, various computer peripherals such as printer, modem, scanner, digital still camera, are developed to enhance the business task or household task.

More particularly, the scanner is developed to catch the image of a picture or even a real article. The captured image is stored in graphic format feasible for computer processing, or can be output to printer or other image output device.

Moreover, due to the difference in size, property and resolution of the article to be scanned such as common textual document, picture, newspaper and magazine. The type of scanner may be different. For example, a hand held scanner is used to scan smaller article and held by user's hand for more convenient use. However, the scanning speed and direction of a hand held scanner is hard to keep constant. Therefore, the scanning quality is degraded. The problem can be solved by using a raster scanner which can move in a constant speed. However, the speed and moving direction of the raster scanner is changed when scanning on an uneven surface.

To obtain more stable scanned image quality, a paper-feeding type scanner or a table scanner can be used. For a paper-feeding type scanner, a paper printed with desired text or picture is fed into the scanner to obtain scanned image of good quality. However, the paper thickness is critical and the paper size is limited. Therefore, the paper-feeding type scanner is not suitable for large-size document. For a table scanner, the article to be scanner is placed on the transparent window and the image sensor within the scanner is driven to move in a constant speed to obtain the image of the article to be scanned. In this type of scanner, the limitation on paper thickness is relieved. However, the scanning size is still limited. Alternatively, the article to be scanned is put facedown on the transparent window of the scanner and the article is scanner segment by segment. However, because the article to be scanned is put facedown on the transparent window, it is hard for user to distinct the boundary between the scanned region and unscanned region. Therefore, the image of some segment may overlap to degrade the image quality.

The present invention is intended to overcome above problem by providing a scanning apparatus, which comprises a transparent housing, a driving means arranged within the transparent housing, and an image sensor arranged within the transparent housing and driven by the driving means. The upper surface and the lower surface of the transparent housing are marked to define a transparent upper window and a transparent lower window. The scanning apparatus is provided with light blocking means to prevent external leaked light. The image sensor comprises a contact image sensor and a supporting box for housing the contact image sensor. The small article to be scanned is facedown placed on the transparent upper window of the scanning apparatus when the scanning apparatus is in erect arrangement. The large article to be scanned is faced up placed and the user can align the scanning region through the transparent upper window and lower window. Therefore, the inventive scanning apparatus is applicable to scan article of both large and small size, and the transparent upper window and lower window facilitate the alignment of scanner for user for entire scanning or partial scanning of an article.

The various objects and advantages of the present invention will be more readily understood from the following detailed description when read in conjunction with the appended drawing, in which:

DETAIL DESCRIPTION OF PREFERRED EMBODIMENT

Figure 1:
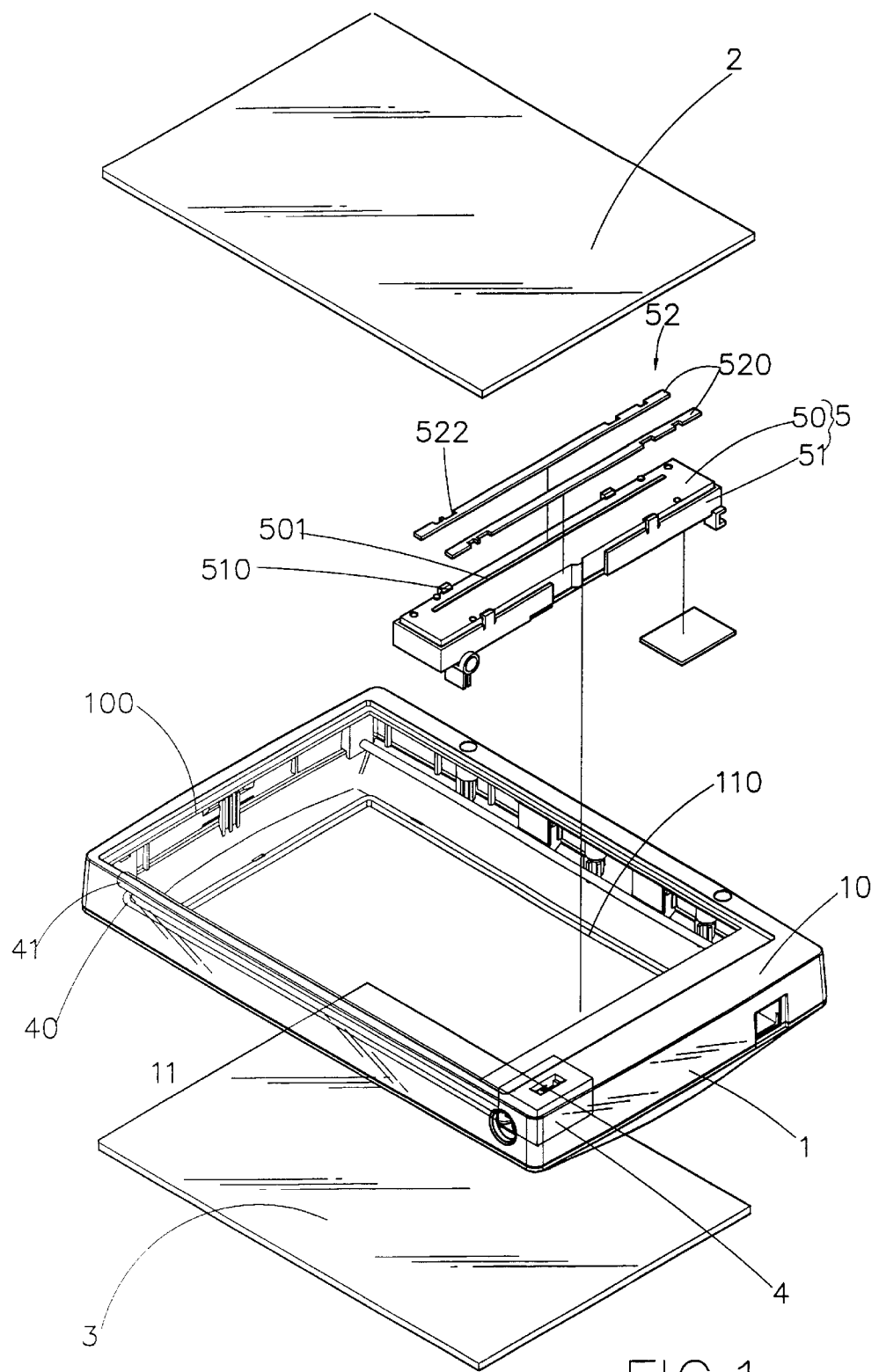
FIG. 1 shows the perspective view of the scanning apparatus according to the present invention.

FIG. 1 shows the perspective view of the scanning apparatus according to the present invention. The inventive scanning apparatus comprises a transparent housing 1, a driving means 4 and an image sensor 5.

Figure 2:
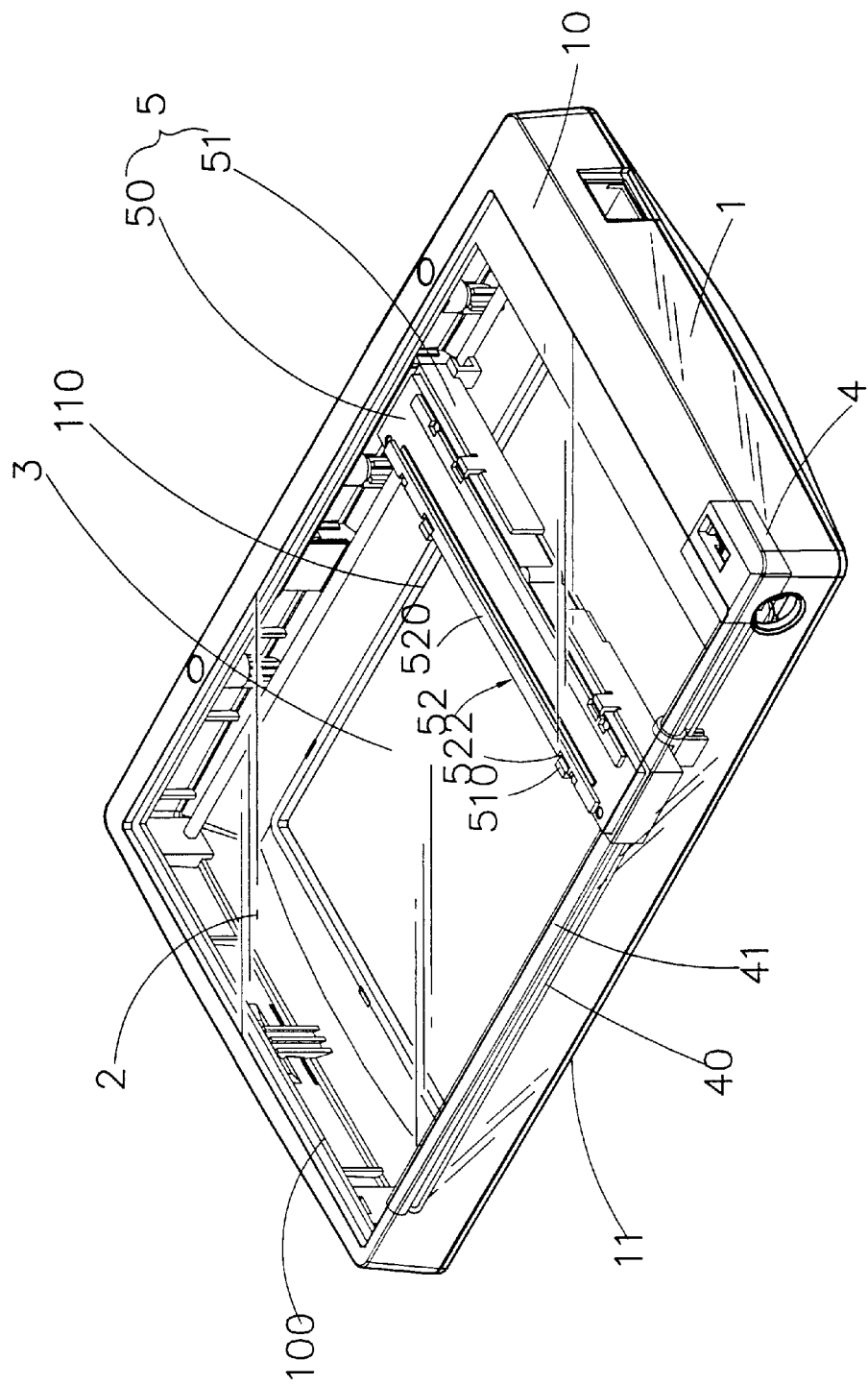
FIG. 2 shows the exploded view of the scanning apparatus according to another embodiment of the present invention.

The transparent housing 1 is integrally made of high-strength and transparent material. Moreover, the transparent housing 1 can be decorated with opaque part on the portion where transparency is not required. The transparent housing 1 is of hollow box shape and has an upper transparent window 2 and a lower transparent window 3 with border marked on the top surface 10 and the bottom surface 11 thereof. Alternatively, as shown in FIG. 2, the transparent housing 1 has an upper opening 100 on the top surface 10 and a lower opening 110 on the lower surface 11 such that a reinforced and durable upper transparent window 2 and a lower transparent window 3 are embedded into the upper opening 100 and the lower opening 110, respectively. The upper transparent window 2 is level with the upper surface 10.

A transmission unit 4 is arranged within the transparent housing 1 and comprises a motor and transmission means with belt 40 and belt wheel. The image sensor 5 is mounted on a guiding shaft 41 driven by the belt 40 such that the image sensor 5 is move below the upper transparent window 2 and scans the article placed upon the upper transparent window 2. The image sensor module 5 in this embodiment comprises a contact image sensor (CIS) 50 and a supporting box 51. Moreover, at least elastic body (not shown) is arranged between the CIS 50 and the supporting box 51. The CIS 50 is clamped by the hook 510 on both sides of the box 51 kept constant distance with the upper transparent window 2 by the guiding shaft 41 such that the CIS 50 is moved while keeping constant separation with the upper transparent window 2.

Figure 3:
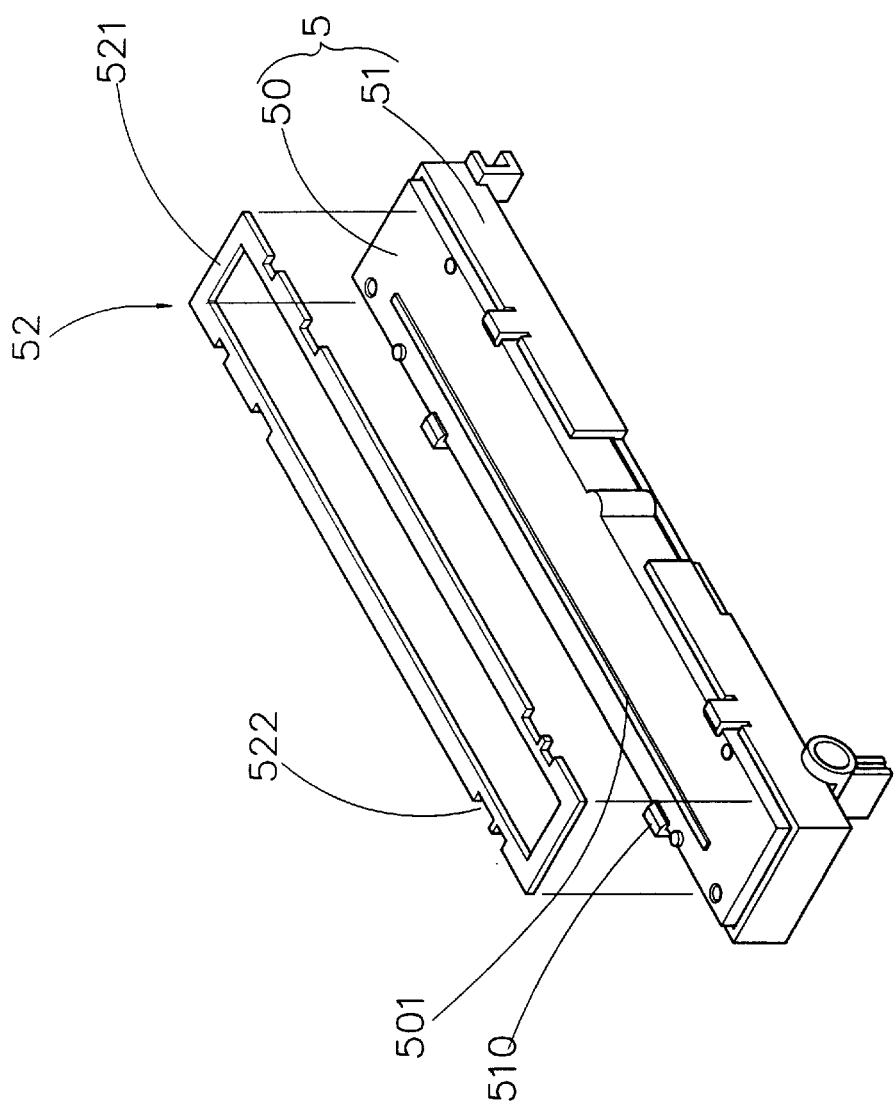
FIG. 3 shows the exploded view of the image sensor according to still another embodiment of the present invention.
Figure 4:
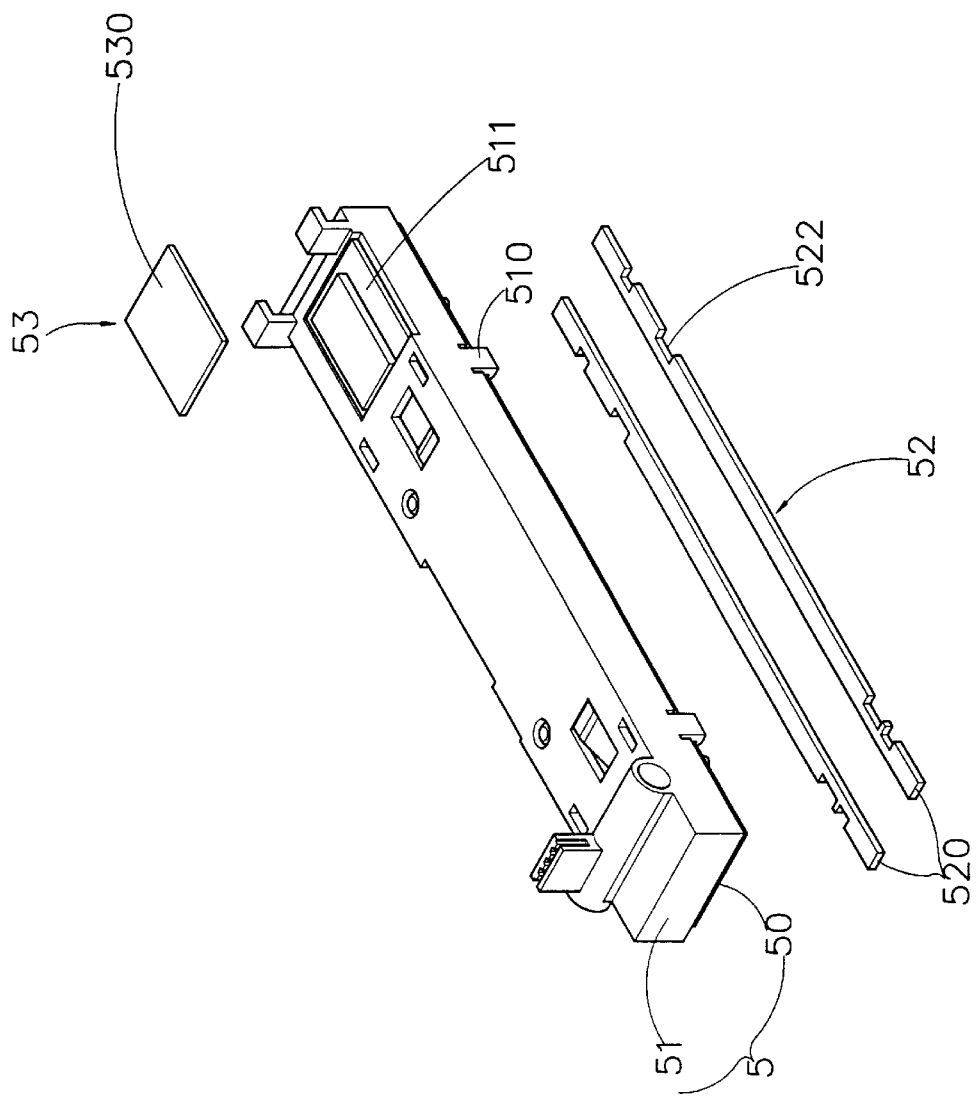
FIG. 4 shows the exploded view of the image sensor from another view angle.

The CIS 50 has a strip-shaped sensing element 501 on top side thereof for performing sensing operation and has a first light-blocking means 52 on lateral side thereof. As shown in FIG. 1, the first light-blocking means 52 comprises two parallel light blocking strips 520 on two lateral sides of the CIS 50. Alternatively, as shown in FIG. 3, the first light-blocking means 52 can also be a frame shaped light blocking sash 521 arranged around the CIS 50. Moreover, the light blocking strips 520 and the frame shaped light blocking sash 521 further comprises staggered dents 522 corresponding to the hook 510 on both sides of the box 51. The first light-blocking means 52 is provided to block the light leaking from lateral side of the transparent box 51 into the strip-shaped sensing element 501. Moreover, as shown in FIG. 4, the transparent box, 51 has slot 511 on the bottom side thereof for allowing the accessing of external signal line. To prevent light leaking from the slot 511, a second light-blocking means 53 with a light blocking plate 530 is arranged beside the slot 511.

Figure 5:
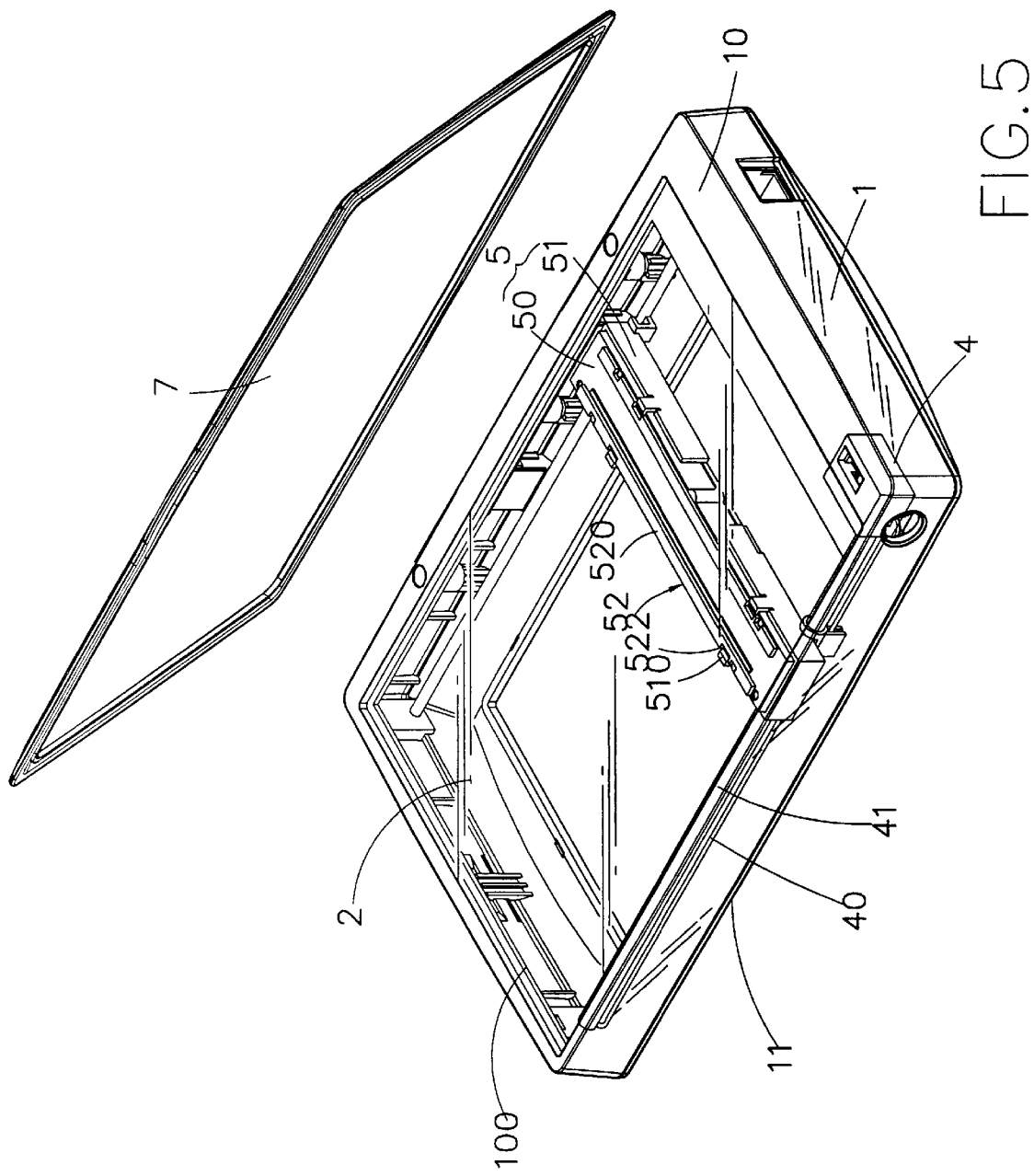
FIG. 5 shows the perspective view of the scanning apparatus with a cover according to the present invention.
Figure 6:
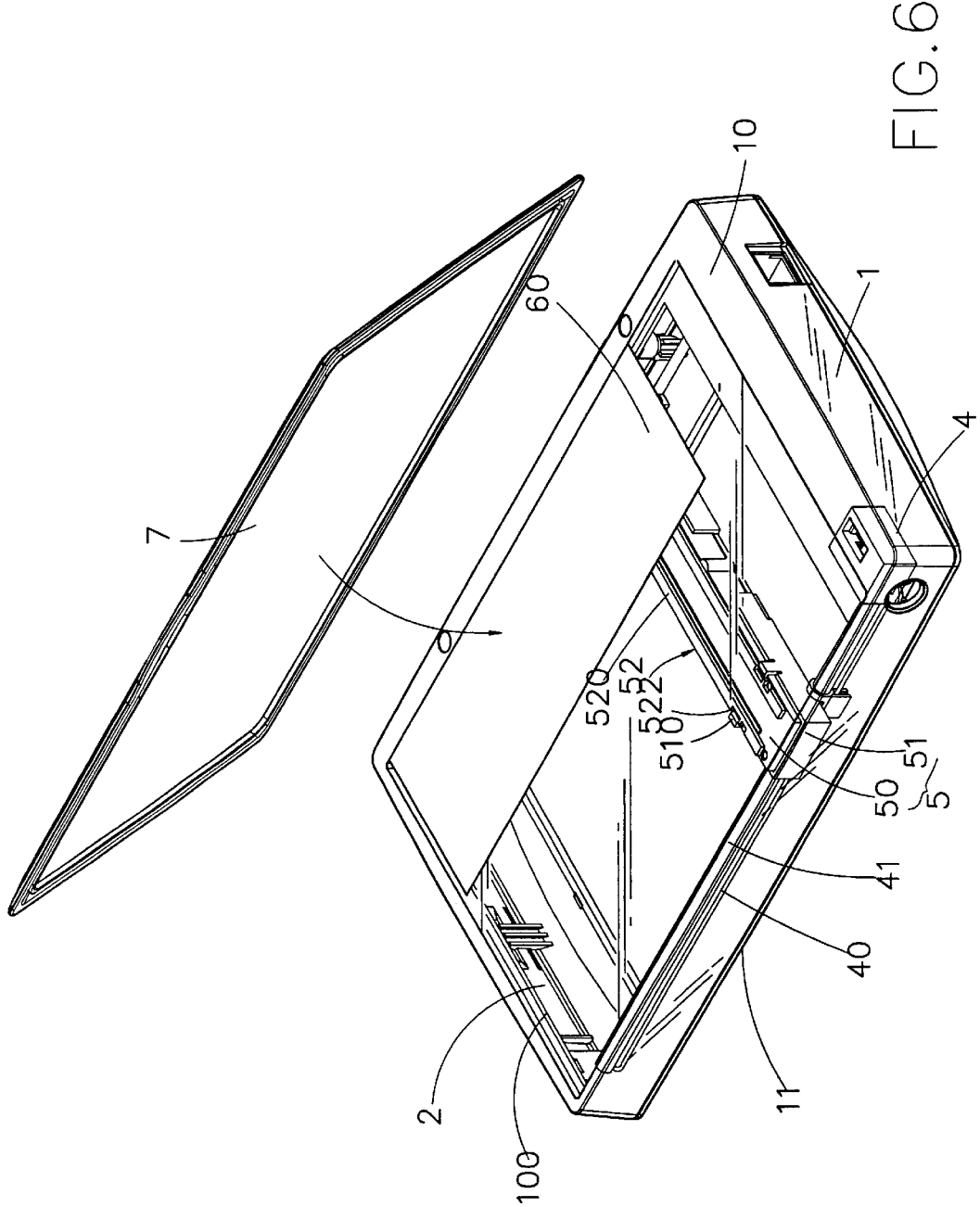
FIG. 6 shows the inventive scanning apparatus with a cover for scanning a small size article.
Figure 7:
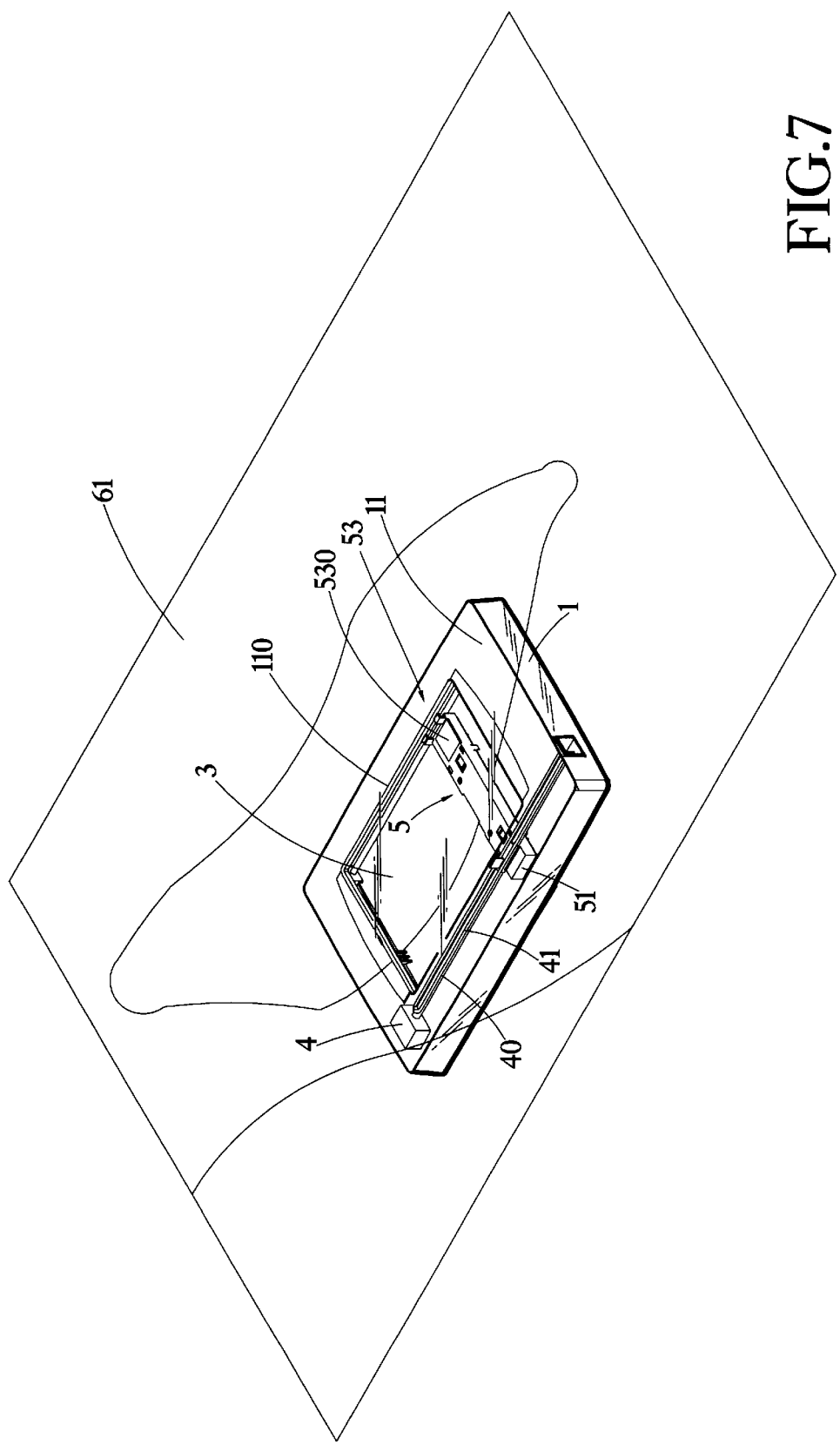
FIG. 7 shows the inventive scanning apparatus for scanning entirely or partially a large size article.

As shown in FIGS. 5 and 6, when the inventive scanning apparatus is used to scan a small size article 60, the inventive scanning apparatus is such placed that the upper transparent window 2 is in erect arrangement and the small size article 60 to be scanned is face-down on the upper transparent window 2. In this situation, the inventive scanning apparatus drives the image sensor 5 in the way similar to conventional desktop scanner. It should be noted that even thought the housing 1 is transparent, the first light-blocking means 52 provided around the strip-shaped sensing element 501 can prevent externally leaking light. Moreover, when the inventive scanning apparatus is used to scan a large size article 61, the inventive scanning apparatus is such placed that the upper transparent window 2 is in invert arrangement. That is, the upper transparent window 2 is face-down and the lower transparent window 3 is face-up. The upper transparent window 2 is face-down attached on the large size article 61 to be scanned. Alternatively, the upper transparent window 2 is kept a predetermined separation with the large size article 61 to be scanned, which is not suitable for attachment, for example, hanged on wall. The user can align the inventive scanning apparatus with the large size article 61 to be scanned through the transparent upper window 2 and lower window 3. The problem of overlap scan and miss-scan can be prevented to ensure the integrity of scanned image. It should be noted that the inventive scanning apparatus in invert arrangement still could be used to scan small size article 60. In this case, the small size article 60 to be scanned is face-up arranged and the inventive scanning apparatus in invert arrangement is attached on the small size article 60 to be scanned. The user can view the scan region through the transparent housing 1, upper window 2 and lower window 3. On the opposite, the small size article 60 to be scanned is placed face down when scanned by a conventional scanner.

Moreover, to enhance the scan, quality, an optional cover 7 is arranged on the top surface 10 of the transparent housing 1, as shown in FIGS. 5 and 6. When the inventive scanning apparatus is in erect arrangement to scan the small size article 60, the cover 7 is used to cover the small size article 60 on the transparent upper window 2.

Moreover, the inventive scanning apparatus can be used in inverted arrangement and can be moved freely to scan article hung on wall or other non-horizontal position. Therefore, the inventive scanning apparatus in comparison with conventional desktop scanner or paper-feeding scanner.

To sum up, the inventive scanning apparatus is applicable to scan article of both large and small size, the housing thereof is transparent such that the user can align the scanner with article to be scanned even though the scanning apparatus is in inverted arrangement. The inventive scanning apparatus does not require movement when scanning a specific region and the article to be scanned is not limited to thin paper.

I claim:

1. A scanning apparatus comprising:
    a transparent housing, said transparent housing having a first window disposed in an upper surface thereof and a second window disposed in a lower surface of said transparent housing, said first and second windows being in parallel relationship;
    driving means arranged within said transparent housing;
    an image sensor arranged within said transparent housing and driven by said driving means, said image sensor comprising a sensing element to scan an article disposed adjacent to said first window; and
    first light blocking means disposed beside said sensing element.

2. The scanning apparatus as in claim 1, wherein said image sensor comprises a contact image sensor and a supporting box for housing said contact image sensor.

3. The scanning apparatus as in claim 2, wherein said supporting box has at least a pair of hooks respectively disposed on opposing sides thereof to clamp said contact image sensor.

4. The scanning apparatus as in claim 1, wherein said first light blocking means comprising two parallel light blocking strips on two lateral sides of said contact image sensor.

5. The scanning apparatus as in claim 2, wherein said first light blocking means is a frame shaped light blocking sash arranged around said contact image sensor.

6. The scanning apparatus as in claim 2, further comprising a second light blocking means on said supporting box and opposite to said contact image sensor.

7. A scanning apparatus comprising:
    a transparent housing;
    driving means arranged within said transparent housing;
    an image sensor arranged within said transparent housing and driven by said driving means, said image sensor including a contact image sensor to scan an article to be scanned and placed adjacent to said scanning apparatus and a supporting box for housing said contact image sensor, said supporting box having a through slot on a bottom thereof opposite to said contact image sensor;
    first light blocking means disposed beside said contact image sensor; and,
    second light blocking means covering said through slot.

8. The scanning apparatus as in claim 6, wherein said second light blocking means is a light blocking plate.

9. The scanning apparatus as in claim 1, further comprising a cover on said transparent housing to cover said article when necessary.

10. The scanning apparatus as in claim 1, wherein said transparent housing can be decorated with opaque part on the portion where transparency is not required.

11. The scanning apparatus as in claim 1, wherein said driving means comprises a guiding shaft to guide the movement of said image sensor, a motor and belt and belt wheel both driven by said motor to move said image sensor.

* * * * *